United States Patent
Li et al.

(10) Patent No.: US 12,487,655 B2
(45) Date of Patent: Dec. 2, 2025

(54) PROJECTION APPARATUS AND CONTROL METHOD THEREOF

(71) Applicant: Coretronic Projection (Kunshan) Corporation, Jiangsu (CN)

(72) Inventors: Gang Li, Jiangsu (CN); Ying Zhang, Jiangsu (CN); Wenyan Yu, Jiangsu (CN); Jian Song, Jiangsu (CN)

(73) Assignee: Coretronic Projection (Kunshan) Corporation, Jiangsu (CN)

( * ) Notice: Subject to any disclaimer, the term of this patent is extended or adjusted under 35 U.S.C. 154(b) by 105 days.

(21) Appl. No.: 18/599,242

(22) Filed: Mar. 8, 2024

(65) Prior Publication Data

US 2024/0310895 A1  Sep. 19, 2024

(30) Foreign Application Priority Data

Mar. 17, 2023 (CN) .......................... 202310261305.7

(51) Int. Cl.
*G06F 1/3231* (2019.01)
*G06F 1/3234* (2019.01)
*H04N 5/74* (2006.01)

(52) U.S. Cl.
CPC .......... *G06F 1/3231* (2013.01); *G06F 1/3265* (2013.01); *H04N 5/7408* (2013.01); *H04N 5/7475* (2013.01)

(58) Field of Classification Search
CPC ... G06F 1/3231; G06F 1/3265; H04N 5/7408; H04N 5/7475
See application file for complete search history.

(56) References Cited

U.S. PATENT DOCUMENTS

| | | | |
|---|---|---|---|
| 10,372,189 B2 * | 8/2019 | Shen | G06F 3/0346 |
| 2008/0238907 A1 * | 10/2008 | Wang | H04W 52/0229 |
| | | | 250/338.1 |
| 2019/0236554 A1 * | 8/2019 | Hill | G06Q 10/02 |

FOREIGN PATENT DOCUMENTS

| | | |
|---|---|---|
| CN | 114786048 | 7/2022 |
| CN | 218298744 | 1/2023 |
| JP | 6586956 | 10/2019 |
| TW | 201145007 | 12/2011 |
| TW | 201621556 | 6/2016 |
| TW | I733883 | 7/2021 |

* cited by examiner

*Primary Examiner* — Terrell S Johnson
(74) *Attorney, Agent, or Firm* — JCIPRNET

(57) ABSTRACT

A projection apparatus and a control method thereof are provided. The projection apparatus includes a processor, a sensor, and a projection module. When a command corresponding to a standby mode is received, the processor sets the projection apparatus to a first sub-standby mode. The sensor is enabled to sense whether there is a living object located in a sensing area outside the projection apparatus. The standby mode is maintained as the first sub-standby mode in response to sensing that the living object is not in the sensing area. The standby mode is set to be switched to a second sub-standby mode in response to sensing that the living object is in the sensing area. A maximum power consumption of the first sub-standby mode is less than a maximum power consumption of the second sub-standby mode. In the first and second sub-standby modes, the projection module is not enabled.

20 Claims, 6 Drawing Sheets

PROJECTION APPARATUS AND CONTROL METHOD THEREOF

CROSS-REFERENCE TO RELATED APPLICATION

This application claims the priority benefit of China application serial no. 202310261305.7, filed on Mar. 17, 2023. The entirety of the above-mentioned patent application is hereby incorporated by reference herein and made a part of this specification.

BACKGROUND

Technical Field

The disclosure relates to a projection technology field, and in particular relates to a projection apparatus and a control method thereof.

Description of Related Art

The application of the projector based on the network has generated many remote control services and applications. On the other hand, when the projector is in a standby mode, the projector is expected to save power consumption. However, if the projector is expected to still be able to implement remote control services and applications based on the network in the standby mode, the projector will consume relatively more power.

Therefore, how to enable the projector to be able to implement remote control based on the network, while expecting the projector to save more power is one of the research directions of projection technology.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides a projection apparatus and a control method thereof, which can enable the projection apparatus to implement remote control in the case where a living object (for example, a person) is sensed, and save power consumption in the case where the living object is not sensed.

Other objectives and advantages of the disclosure can be further understood from the technical features disclosed in the disclosure.

In order to achieve one, a part, or all of the above objectives or other objectives, the projection apparatus of the disclosure includes a processor, a sensor, and a projection module. The processor is respectively coupled to the sensor and the projection module. The processor is configured to: set the projection apparatus to a first sub-standby mode when receiving a command corresponding to a standby mode; enable the sensor to sense whether there is a living object located in a sensing area outside the projection apparatus; maintain the standby mode as the first sub-standby mode in response to sensing that the living object is not in the sensing area; and set the standby mode to switch from the first sub-standby mode to a second sub-standby mode in response to sensing that the living object in the sensing area. A maximum power consumption of the projection apparatus in the first sub-standby mode is less than a maximum power consumption of the projection apparatus in the second sub-standby mode, and in the first sub-standby mode and the second sub-standby mode, the projection module is not enabled.

In an embodiment of the disclosure, the standby mode includes a first standby mode, a second standby mode, and a third standby mode. A maximum power consumption of the first standby mode is similar to the maximum power consumption of the first sub-standby mode, a maximum power consumption of the second standby mode is similar to the maximum power consumption of the second sub-standby mode, and in the first standby mode and the second standby mode, the processor does not enable the sensor. When the processor sets the standby mode of the projection apparatus to the third standby mode, the projection apparatus switches between the first sub-standby mode and the second sub-standby mode. In the third standby mode, the sensor of the projection apparatus is enabled.

In an embodiment of the disclosure, the projection apparatus further includes a network connection device, which is coupled to the processor. In the first sub-standby mode, the network connection device is not enabled, and in the second sub-standby mode, the network connection device is enabled, and setting data is obtained by the network connection device.

In an embodiment of the disclosure, in the second sub-standby mode, the processor is configured to: judge whether the setting data includes a predetermined turn-on time of the projection apparatus; setting the predetermined turn-on time of the projection apparatus according to the setting data in response to the setting data including the predetermined turn-on time; and sensing, by the sensor, whether there is the living object located in the sensing area in response to the setting data not including the predetermined turn-on time or the predetermined turn-on time not yet being reached.

In an embodiment of the disclosure, in the first sub-standby mode or the second sub-standby mode, the processor judges whether the predetermined turn-on time is reached to control the projection apparatus to turn on.

In an embodiment of the disclosure, when the projection apparatus is set to turn on at the predetermined turn-on time according to the setting data, the processor is configured to: obtain image data by the network connection device; and enable the projection module to project according to the image data.

In an embodiment of the disclosure, the sensor includes a passive infrared detector, a heat source sensor, a laser sensor, or a combination thereof.

In an embodiment of the disclosure, the projection apparatus further includes an apparatus turn-on module, which is configured to turn on the projection apparatus. The apparatus turn-on module is powered and enabled in the first sub-standby mode and the second sub-standby mode.

In an embodiment of the disclosure, the processor is configured to: enable the sensor to continuously sense in real time whether there is the living object located in the sensing area in the first sub-standby mode.

In an embodiment of the disclosure, the processor is configured to: set the standby mode to switch from the second sub-standby mode to the first sub-standby mode in response to sensing that the living object is not located in the sensing area within a preset time in the second sub-standby mode.

In an embodiment of the disclosure, the projection apparatus further includes a network connection device, which is coupled to the processor. The processor is configured to: enable and disable the network connection device at a preset frequency, and obtain setting data when the network connection device is turned on in the first sub-standby mode.

In order to achieve one, a part, or all of the above objectives or other objectives, the disclosure proposes a control method of a projection apparatus. The projection apparatus includes a processor, a sensor, and a projection module. The processor is respectively coupled to the sensor and the projection module. The control method includes: setting the projection apparatus to a first sub-standby mode when receiving a command corresponding to a standby mode; enabling the sensor to sense whether there is a living object located in a sensing area outside the projection apparatus; maintaining the standby mode as the first sub-standby mode by the processor in response to sensing that the living object is not in the sensing area; and setting the standby mode to switch from the first sub-standby mode to a second sub-standby mode by the processor in response to sensing that there is the living object in the sensing area. A maximum power consumption of the projection apparatus in the first sub-standby mode is less than a maximum power consumption of the projection apparatus in the second sub-standby mode, and in the first sub-standby mode and the second sub-standby mode, the projection module is not enabled.

In an embodiment of the disclosure, the standby modes of the projection apparatus include a first standby mode, a second standby mode, and a third standby mode. A maximum power consumption of the first standby mode is similar to the maximum power consumption of the first sub-standby mode, a maximum power consumption of the second standby mode is similar to the maximum power consumption of the second sub-standby mode, and in the first standby mode and the second standby mode, the processor does not enable the sensor. The step of enabling the sensor in the standby mode of the projection apparatus includes: switching the projection apparatus between the first sub-standby mode and the second sub-standby mode when the standby mode of the projection apparatus is set to the third standby mode. In the third standby mode, the sensor of the projection apparatus is enabled.

In an embodiment of the disclosure, the projection apparatus further includes a network connection device, which is coupled to the processor. In the first sub-standby mode, the network connection device is not enabled. In the second sub-standby mode, the network connection device is enabled, and setting data is obtained by the network connection device.

In an embodiment of the disclosure, the control method further includes: judging whether the setting data includes a predetermined turn-on time of the projection apparatus, and setting the predetermined turn-on time of the projection apparatus according to the setting data by the processor in the second sub-standby mode; and sensing whether there is the living object located in the sensing area through the sensor in response to the setting data not including the predetermined turn-on time or the predetermined turn-on time not yet being reached.

In an embodiment of the disclosure, the control method further includes: judging whether the predetermined turn-on time is reached to control the projection apparatus to turn on through the processor in the first sub-standby mode or the second sub-standby mode.

In an embodiment of the disclosure, the step of setting the projection apparatus to turn on at the predetermined turn-on time according to the setting data further includes: obtaining image data by the network connection device; and enabling the projection module to project according to the image data.

In an embodiment of the disclosure, the step of enabling the sensor to sense whether there is the living object located in the sensing area includes: enabling the sensor to continuously sense in real time whether there is the living object located in the sensing area in the first sub-standby mode.

In an embodiment of the disclosure, the control method further includes: setting the standby mode to switch from the second sub-standby mode to the first sub-standby mode in response to sensing that the living object is not located in the sensing area within a preset time in the second sub-standby mode.

In an embodiment of the disclosure, the projection apparatus includes a network connection device, and the network connection device is coupled to the processor. The control method further includes: enabling and disabling the network connection device at a preset frequency, and obtaining setting data when the network connection device is turned on in the first sub-standby mode.

Based on the above, the projection apparatus and the control method thereof provided by the disclosure use the sensor in the projection apparatus to sense whether there is the living object around the projection apparatus, so that the projection apparatus may switch from a state non-connectable to a network to a state connectable to the network in the case where there is the living object around the projection apparatus, thereby obtaining the latest setting data through the network, so as to implement remote control. Also, in the case where the living object is not around the projection apparatus, the projection apparatus switches to the state non-connectable to the network, so as to save power consumption.

Other objectives, features and advantages of the disclosure will be further understood from the further technological features disclosed by the embodiments of the disclosure wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
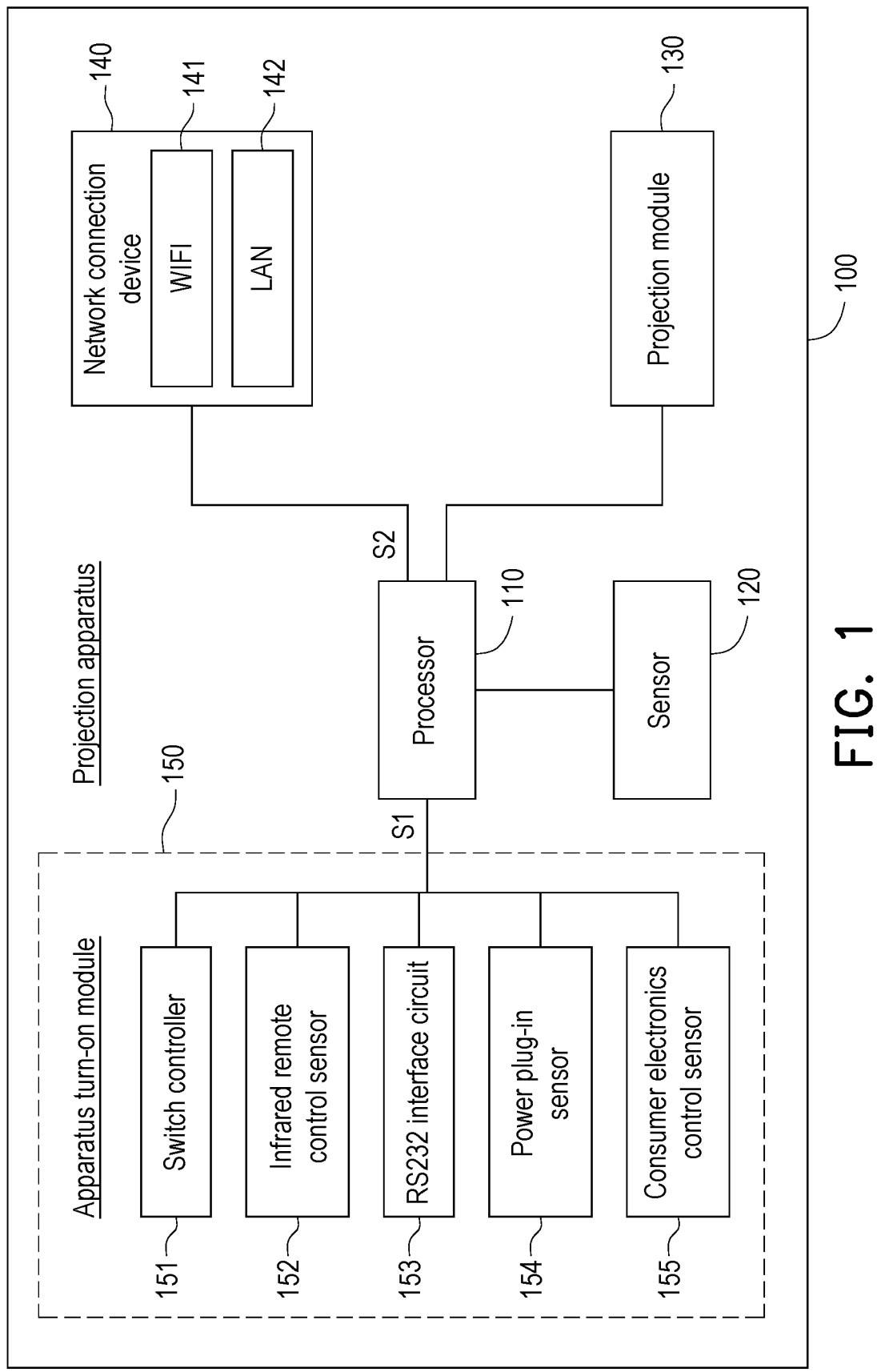
FIG. 1 is a schematic diagram of a projection apparatus according to a first embodiment of the disclosure.

It is to be understood that other embodiment may be utilized and structural changes may be made without departing from the scope of the disclosure. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted", and variations thereof herein are used broadly and encompass direct and indirect connections, couplings, and mountings.

A projection apparatus may be connected to a cloud server through a network connection device (for example, a wireless network (WIFI) module, a wired local area network (LAN) module, or a device, a circuit, and a module with corresponding functions) when turned on, thereby obtaining corresponding network settings, thereby implementing various remote control and applications.

The projection apparatus may have two standby modes in a standby state, which are respectively a first standby mode without the network connection function (referred to as an economical (ECO) mode in the embodiment) and a second standby mode with the network connection function mode (referred to as an active mode in the embodiment). In other words, when a user sets the standby mode of the projection apparatus to the first standby mode (the ECO mode), the projection apparatus does not supply power to the network connection device, so there is no network connection function, and the remote control and applications cannot be implemented. When the user sets the standby mode of the projection apparatus to the second standby mode (the active mode), the projection apparatus supplies power to the network connection device, so there is the network connection function, but the power consumption in the second standby mode is higher. If the user sets the standby mode of the projection apparatus to the second standby mode but does not use the remote control and applications frequently, waste of power cannot be prevented.

Since the projection apparatus needs to project for the user to view, when there is no user near the projection apparatus, the projection apparatus being turned on and/or the network connection is waste of power. Therefore, the embodiment of the disclosure adds another standby mode (referred to as an automatic (auto) mode in the embodiment) in addition to the two standby modes above. This standby mode (the auto mode) enables a sensor disposed on the projection apparatus, and use the sensor to sense whether there is a living object (for example, a person as the user) around the projection apparatus, thereby switching the mode by itself to selectively set the projection apparatus in a state non-connectable to a network or a state connectable to the network.

For example, when the projection apparatus senses that there is the living object around the projection apparatus, the projection apparatus switches from a first sub-standby mode similar to the first standby mode (the ECO mode) to a second sub-standby mode similar to the second standby mode (the active mode), thereby obtaining the latest setting data through the network to implement remote control. Also, when the projection apparatus senses that the living object is not around the projection apparatus, the standby mode of the projection apparatus switches to the state non-connectable to the network, such as switching back to the first sub-standby mode to save power consumption. In the embodiment, the other standby mode is referred to as a third standby mode, and various details are described in detail in the drawings and description.

FIG. 1 is a schematic diagram of a projection apparatus 100 according to a first embodiment of the disclosure. The projection apparatus 100 mainly includes a processor 110, a sensor 120, and a projection module 130. The processor 110 is respectively coupled to the sensor 120 and the projection module 130. The processor 110 is, for example, a microprocessor, other programmable general purpose or specific purpose micro control units (MCU), central processing units (CPU), digital signal processors (DSP), programmable controllers, application specific integrated circuits (ASIC), graphics processing units (GPU), image signal processors (ISP), image processing units (IPU), arithmetic logic units (ALU), complex programmable logic devices (CPLD), and field programmable logic gate arrays (FPGA), other similar elements, or a combination of the above elements. The projection apparatus 100 may further include a network connection device 140, an apparatus turn-on module 150, and other components. The network connection device 140 may include a wireless network module 141 and a local area network module 142. In other embodiments, the network connection device 140 may also include a wireless local area network (WLAN) module (not shown). The apparatus turn-on module 150 may include a switch controller 151, an infrared remote control sensor 152, an RS232 interface circuit 153, a power plug-in sensor 154, and an audio-visual playback (consumer electronics control, CEC) sensor 155.

When the projection apparatus 100 is turned on, components or modules in the projection apparatus 100 are enabled to perform corresponding functions. The projection module 130 is enabled to implement the projection function of the projection apparatus 100. For example, the projection module 130 may obtain an image signal from an image source, and project an image by using a light emitting unit and a projection lens. The projection apparatus 100 may use the wireless network module 141 to connect to a wireless network or use the local area network module 142 to connect to a network in a wired manner. The processor 110 may be connected to a cloud server by the network connection device 140 for the remote control and applications. In other words, the network connection device 140 may be used as the image source based on a remote network and may also provide a remote control signal to the processor 110 to implement remote control.

The apparatus turn-on module 150 may provide control signals to the processor 110 of the projection apparatus 100, and the control signals include a turn-on signal of the projection apparatus 100. In detail, the switch controller 151 is configured to sense whether a power switch on the projection apparatus 100 is pressed, so as to transmit the corresponding control signal or the turn-on signal to the processor 110. The infrared remote control sensor 152 may receive a remote control signal transmitted by a remote control in the hand of the user to transmit the corresponding control signal to the processor 110. The RS232 interface circuit 153 transmits control signals to the processor 110 through an RS232 interface. The power plug-in sensor 154 is disposed at a power cord plug-in position of the projection apparatus 100 and is configured to correspondingly generate the turn-on signal and transmit the turn-on signal to the processor 110 when a power cord is plugged in and power is supplied. When the consumer electronics control sensor 155 obtains an image signal from the image source (for example, a digital versatile disc (DVD) player, a Blu-ray disc player, etc.) in communication, the consumer electronics control sensor 155 generates a corresponding control signal, and the control signal and the image signal are both transmitted to the processor 110. The apparatus turn-on module 150 does not obtain the control signal and the turn-on signal from the network connection device 140. In addition to a turn-on state, the projection apparatus 100 also has a standby mode state, so as to save power when the projection apparatus 100 is not in use, and the projection apparatus 100 may be turned on under control.

Figure 2:
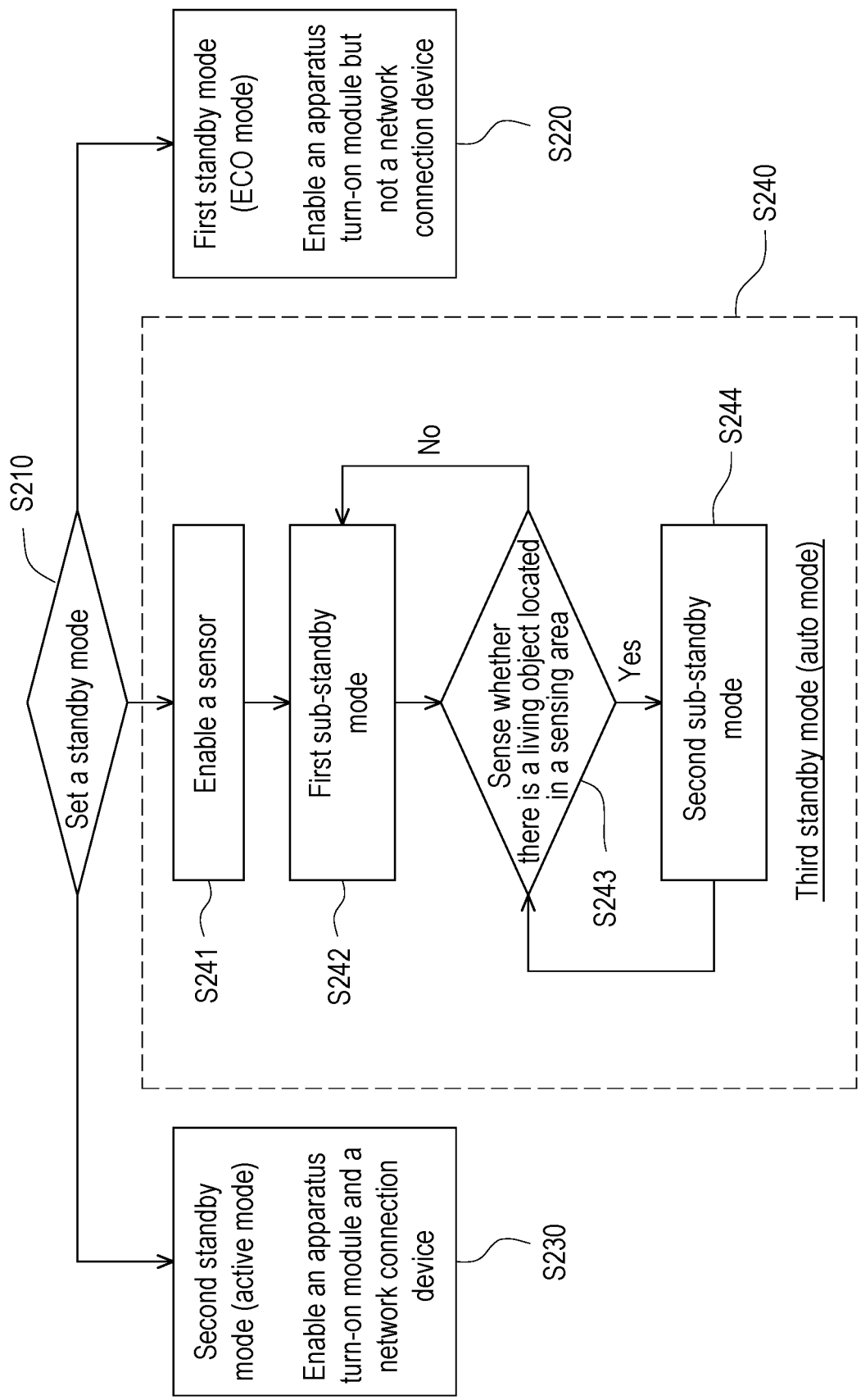
FIG. 2 is a flowchart of a control method of a projection apparatus according to the first embodiment of the disclosure.

FIG. 2 is a flowchart of a control method of a projection apparatus according to the first embodiment of the disclosure. FIG. 2 presents the general operation manners of the projection apparatus of the embodiment when different standby modes are set, and FIG. 2 combined with the components of the projection apparatus 100 in FIG. 1 is taken as an example. In Step S210, the user may set the type of the standby mode in the projection apparatus 100. For example, the standby mode of the projection apparatus 100 may be set to the first standby mode (the ECO mode) (Step S220), the second standby mode (the active mode) (Step S230), or the third standby mode (the auto mode) (Step S240), wherein the user may, for example, select the type of the standby mode from function options of an on-screen display (OSD) menu projected through the projection apparatus 100 or use a specific button on the remote controller in the hand of the user, and the infrared remote control sensor 152 receives the remote control signal to be transmitted to the processor 110, so as to set the type of the standby mode.

In the first standby mode (the ECO mode) of Step S220, the projection apparatus 100 only enables components in the apparatus turn-on module 150 to detect whether a turn-on signal S1 not based on a network function is obtained and does not enable the sensor 120, the projection module 130, and the network connection device 140, wherein the sensor 120, the projection module 130, and the network connection device 140 are not enabled since no power is supplied. If the turn-on signal S1 is obtained in the first standby mode, the projection apparatus 100 is turned on and in a state where an image may be projected. The first standby mode of the embodiment may enable the standby power consumption of the projection apparatus 100 to be lower than 0.5 watts (W).

In the second standby mode (the active mode) of Step S230, in addition to enabling the components in the apparatus turn-on module 150, the projection apparatus 100 also enables the network connection device 140 to detect whether the turn-on signal S1 not based on the network function and a turn-on signal S2 based on the network function are obtained. If the turn-on signal S1 not based on the network function or the turn-on signal S2 based on the network function is obtained in the second standby mode, the projection apparatus 100 switches from the second standby mode to the turn-on state. The sensor 120 and the projection module 130 are not enabled in the second standby mode (the active mode). The second standby mode of the embodiment enables the standby power consumption of the projection apparatus 100 to be higher than 0.5 watts and lower than the power consumption of the projection apparatus 100 in the turn-on state. For example, in the second standby mode, when only the local area network module 142 is enabled, the standby power consumption of the projection apparatus 100 is about 2 watts; and when the wireless network module 141 and the local area network module 142 are enabled at the same time, the standby power consumption of the projection apparatus 100 is about 8 watts.

When the user sets the standby mode of the projection apparatus 100 to the third standby mode, the process enters Step S240 from Step S210. In Step S240, when the processor 110 in FIG. 1 sets the standby mode of the projection apparatus 100 to the third standby mode, the projection apparatus 100 may switch between the first sub-standby mode and the second sub-standby mode, wherein in the third standby mode, the sensor 120 of the projection apparatus 100 is enabled.

Specifically, in Step S241, the processor 110 of the embodiment enables the sensor 120 of FIG. 1 after receiving a command corresponding to the third standby mode (the auto mode). The sensor 120 is configured to sense whether there is a living object located in a sensing area outside the projection apparatus 100. The embodiment does not limit where the sensor 120 needs to be disposed on the projection apparatus 100, and the sensor 120 may not be disposed on the housing of the projection apparatus 100, but may be separated from the housing of the projection apparatus 100. The sensor 120 can mainly sense the living object passing by a sensing range thereof. The sensor 120 may be a passive infrared (PIR) detector, a thermal sensor, a laser sensor, or a combination of the above sensors. The sensor 120 of the embodiment is mainly implemented by the passive infrared detector. Since the passive infrared detector has low power consumption, the passive infrared detector can save power when enabled in the standby mode of the projection apparatus 100. The distance detectable by the passive infrared detector is within about 5 meters, and the horizontal angle and the vertical angle detectable by the passive infrared detector are respectively within 100 degrees and 82 degrees, but not limited thereto. The passive infrared detector detects in real time whether there is the living object located in the sensing area. Persons applying the embodiment may adjust the type of the sensor 120 according to their requirements and may also select sensors with other detection ranges according to usage environments.

In Step S242, the projection apparatus 100 is set to the first sub-standby mode. The "first sub-standby mode" of the embodiment is similar in function to the first standby mode (the ECO mode), wherein in both modes, power is supplied and the apparatus turn-on module 150 in the projection apparatus 100 is enabled, and the turn-on signal may be obtained by the apparatus turn-on module 150 to switch the projection apparatus 100 from the standby mode to being turned on. However, the projection apparatus 100 in the first standby mode does not enable the sensor 120. Therefore, the standby power consumption of the projection apparatus 100 in the first standby mode is similar to the standby power consumption of the projection apparatus 100 in the first sub-standby mode, the maximum power consumption of the projection apparatus 100 in the first standby mode is the same as the maximum power consumption of the projection apparatus 100 in the first sub-standby mode, and the only difference between the two is that the sensor 120 is enabled in the first sub-standby mode, so there is the additional power consumption of the sensor 120.

In Step S243, in the first sub-standby mode of the third standby mode, the processor 110 uses the enabled sensor 120 to sense whether there is the living object located in the sensing area outside the projection apparatus 100. If the result of Step S243 is no, that is, in response to sensing that the living object is not in the sensing area, the processor 110 returns to Step S242 from Step S243 to maintain the first sub-standby mode of the projection apparatus 100. Conversely, if the result of Step S243 is yes, that is, in response to the living object being sensed in the sensing area, the processor 110 proceeds to Step S244 from Step S243 to set the standby mode of the projection apparatus 100 to switch from the first sub-standby mode to the second sub-standby mode. In Step S244, when the standby mode of the projection apparatus 100 is the second sub-standby mode, the processor 110 still executes Step S243 at a fixed frequency or after a preset time, that is, the processor 100 uses the sensor 120 to sense after every preset time or within a preset time (for example, 5 minutes), and judge whether there is the living object located in the sensing area. If the living object is not sensed in the sensing area within the preset time (for example, 5 minutes), it means that the projection apparatus 100 is currently not used by anyone, and the processor 110 sets the standby mode to switch from the second sub-standby mode to the first sub-standby mode, that is, return to Step S242 from Step S244 via Step S243, so as to reduce the power consumption of the projection apparatus 100. The preset time may be adjusted by persons applying the embodiment according to their requirements, or the value may be set by the user himself.

The "second sub-standby mode" of the embodiment is similar in function to the second standby mode (the active mode), wherein in addition to supplying power and enabling the apparatus turn-on module 150 in the projection apparatus 100, power is also supplied to the network connection device 140 to implement the remote control and applications. However, the projection apparatus 100 in the second standby mode does not enable the sensor 120. Therefore, the standby power consumption of the projection apparatus 100 in the second standby mode is similar to the standby power consumption of the projection apparatus 100 in the second sub-standby mode, the maximum power consumption of the projection apparatus 100 in the second standby mode is the same as the maximum power consumption of the projection apparatus 100 in the second sub-standby mode, and the only difference between the two is that the sensor 120 is enabled in the second sub-standby mode, so there is the additional power consumption of the sensor 120. The maximum power consumption of the projection apparatus 100 in the first sub-standby mode is less than the maximum power consumption of the projection apparatus 100 in the second sub-standby mode. Moreover, in the first sub-standby mode and the second sub-standby mode, the projection module 130 of the projection apparatus 100 is not enabled, that is, the projection module 130 is not powered and does not project an image.

Figure 3:
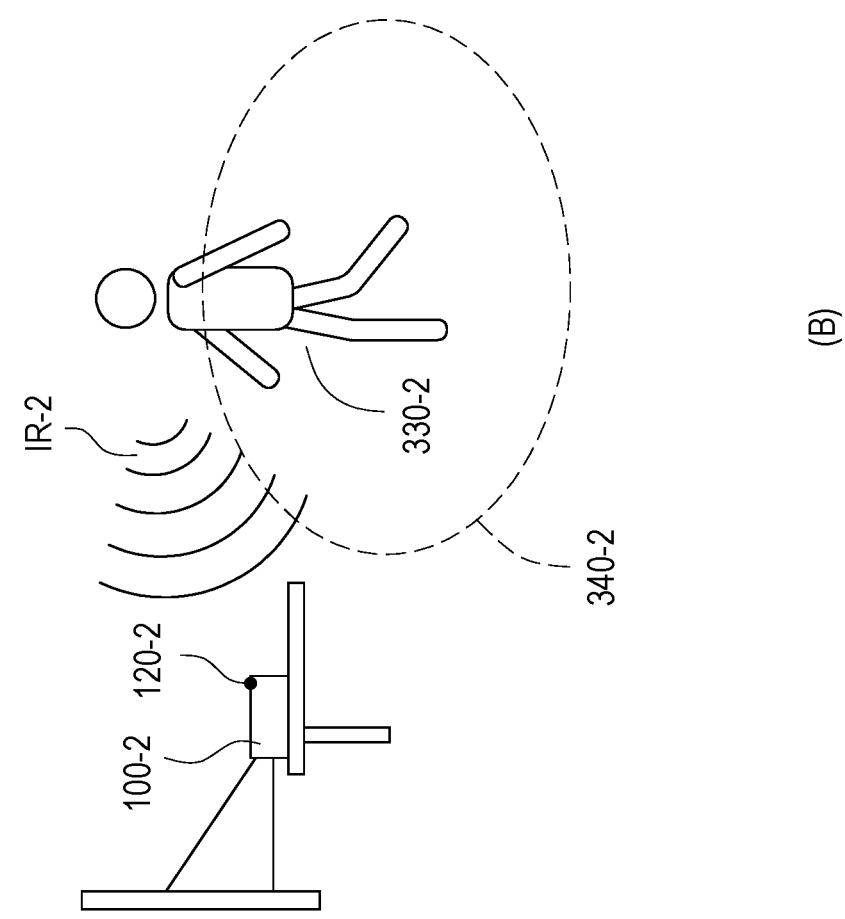
FIG. 3 is a schematic diagram of a sensor, a living object, and a sensing area in a projection apparatus according to an embodiment of the disclosure.
Figure 3:
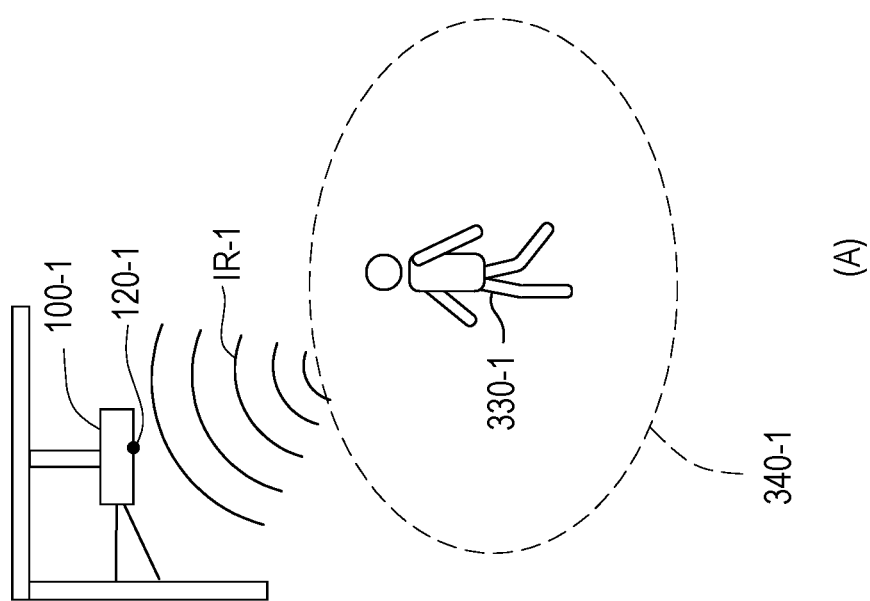

FIG. 3 is a schematic diagram of a sensor, a living object, and a sensing area in a projection apparatus according to an embodiment of the disclosure. Please refer to the left part (A) of FIG. 3, a projection apparatus 100-1 may be fixed on a ceiling of a room and disposed in a suspended manner, and a sensor 120-1 of the projection apparatus 100-1 is positioned relative to a sensing area 340-1 outside the projection apparatus 100-1 to sense whether there is a living object 330-1 (for example, a human body). The living object 330-1 of the embodiment is, for example, the human body and naturally releases a far infrared IR-1 with a specific waveband (for example, the wavelength is about 9000 nm to 10000 nm), so that the sensor 120-1 may sense whether there is the living object 330-1 (the human body) located within the sensing area 340-1 by the far infrared IR-1 with the specific waveband. Please refer to the right part (B) of FIG. 3, a projection apparatus 100-2 may be placed on a desktop, and a sensor 120-2 of the projection apparatus 100-2 is positioned relative to a sensing area 340-2 outside the projection apparatus 100-2 to sense whether there is a living object 330-2 (for example, a human body). The living object 330-2 of the embodiment emits a far infrared IR-2 with a specific waveband, so that the sensor 120-2 may sense whether there is the living object 330-2 (the human body) located in the sensing area 340-2 by the far infrared IR-2 with the specific waveband.

Figure 4:
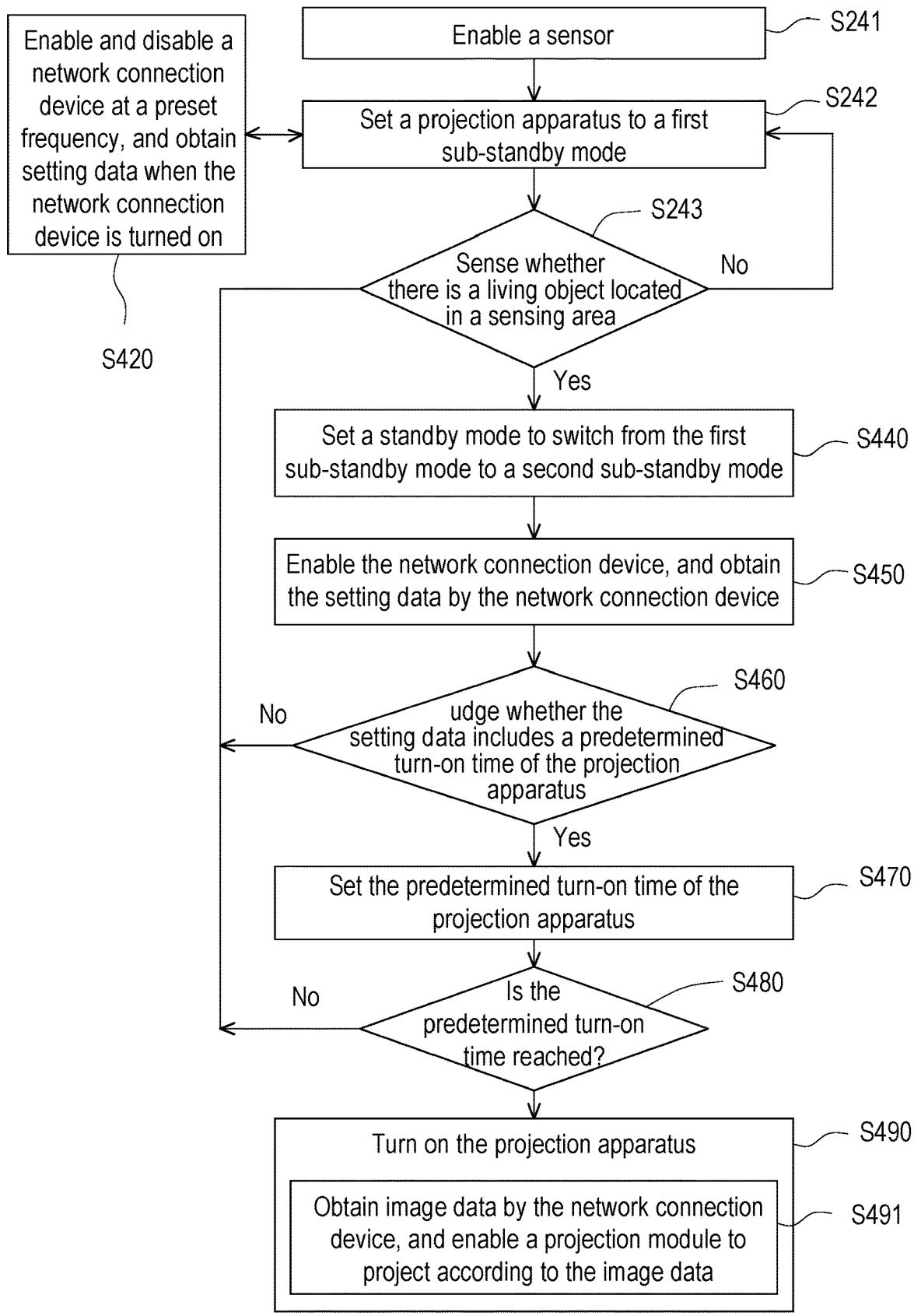
FIG. 4 is a flowchart of a control method of a projection apparatus according to a second embodiment of the disclosure.

FIG. 4 is a flowchart of a control method of a projection apparatus according to a second embodiment of the disclosure. The control method shown in FIG. 4 is a flowchart of steps based on Step S240 in FIG. 2 and having more implementation details, and the steps in FIG. 4 may be applied to the projection apparatus 100 in FIG. 1. Please refer to FIG. 1 and FIG. 4 at the same time, wherein Step S241 to Step S243 in FIG. 4 are the same as Step S241 to Step S243 in FIG. 2. If the result of Step S243 in FIG. 4 is yes, that is, in response to the living object being sensed in the sensing area, the process enters Step S440 from Step S243 to set the standby mode of the projection apparatus 100 to switch from the first sub-standby mode to the second sub-standby mode. It is particularly noted that in the first sub-standby mode, the sensor 120 continuously senses in real time whether there is the living object located in the sensing area in Step S243 of the embodiment.

In Step S450, the processor 110 enables the network connection device 140 in the second sub-standby mode, and obtains setting data from outside the projection apparatus 100 by the network connection device 140.

In Step S460, the processor 110 judges whether the setting data obtained from the network in Step S450 includes a predetermined turn-on time of the projection apparatus 110. The predetermined turn-on time is the time scheduled to turn on the projection apparatus 110 and play an image set by the user in advance when using the network for remote control.

If the result of Step S460 is yes, that is, in response to the setting data including the predetermined turn-on time, the process enters Step S470 from Step S460, and the processor 110 sets the predetermined turn-on time of the projection apparatus 110 according to the setting data or update data. In contrast, if the result of Step S460 is no, that is, in response to the setting data not including the predetermined turn-on time, it means that the projection apparatus 110 is not set with the predetermined turn-on time, so the process returns to Step S243 from Step S460 to sense whether there is the living object appearing through the sensor 120, so as to determine whether to set the standby mode of the projection apparatus 110 to the first sub-standby mode or the second sub-standby mode.

In Step S480, in the second sub-standby mode, the processor 110 judges whether the current time reaches the predetermined turn-on time. If the result of Step S480 is yes, the process enters Step S490 from Step S480, and the processor 110 controls the projection apparatus 100 to turn on when the predetermined turn-on time is reached. If the result of Step S480 is no, that is, in response to the predetermined turn-on time not yet being reached, the process returns to Step S243 from Step S480 to sense whether there is the living object through the sensor 120, so as to determine whether to set the standby mode of the projection apparatus 110 to the first sub-standby mode or the second sub-standby mode. Regardless of whether the standby mode of the projection apparatus 100 is in the first sub-standby mode or the second sub-standby mode, as long as the predetermined turn-on time is set, the processor 110 judges whether the predetermined turn-on time is reached to control the projection apparatus 100 to turn on. One of the manners of executing Step S490 is as described in Step S491. After the projection apparatus 100 is turned on, the processor 110 may obtain image data by the network connection device 140, and enable the projection module 130 to project according to the image data, so that the user near the projection apparatus 100 may view. Alternatively, the processor 110 may enable the projection module 130 to project according to the image data obtained from other external devices or the image data stored inside the projection apparatus 110.

On the other hand, in order to enable the projection apparatus 100 in the first sub-standby mode to be able to periodically obtain the setting data corresponding to the remote control and meet the need for the projection apparatus 100 to project an image in the case where the living object is not nearby in some remote control applications, so in FIG. 4 of the disclosure, when the projection apparatus 100 is set to the first sub-standby mode (Step S242), Step S420 may be executed, even if the network connection device 140 of the projection apparatus 100 in FIG. 1 is enabled and disabled at a preset frequency, that is, the projection apparatus 100 switches from the first sub-standby mode to the second sub-standby mode and then switches back to the first sub-standby mode from the second sub-standby mode at the preset frequency, wherein the setting data is obtained when the network connection device 140 is turned on. Thereby, in the embodiment of the disclosure, it is possible to selectively judge whether to set the predetermined turn-on time of the projection apparatus 100 in the first sub-standby mode. The "preset frequency" may be set by the user, automatically set by the actual application scenario, or adjusted by persons applying the embodiment according to their requirements. For example, the network connection device 140 may be set to be enabled to connect to the network at an average frequency of every 5 minutes, 20 minutes, or 2 hours in the first sub-standby mode, so as to obtain the setting data.

Figure 5:
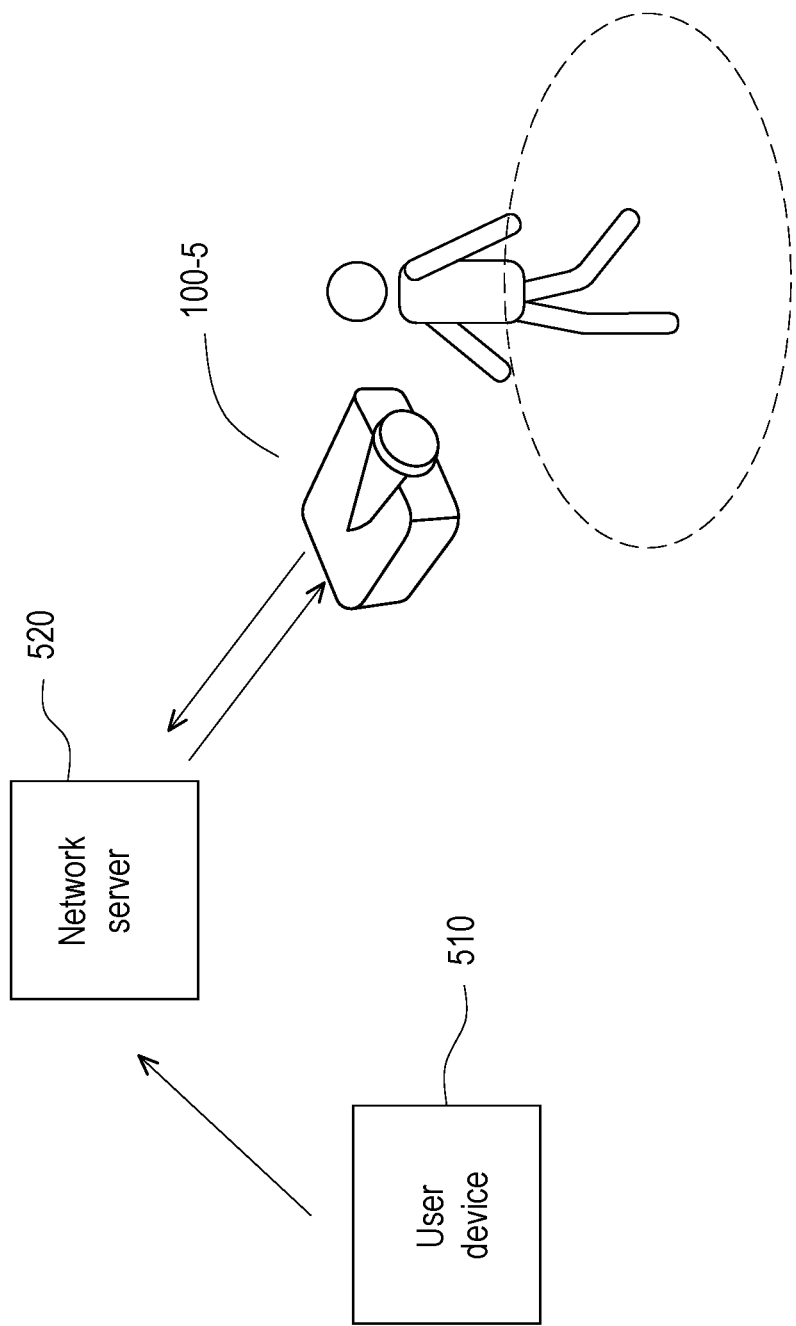
FIG. 5 is a schematic diagram of an application scenario in accordance with the foregoing embodiments of the disclosure.

FIG. 5 is a schematic diagram of an application scenario in accordance with the foregoing embodiments of the disclosure. FIG. 5 presents a user device 510, a network server 520, and a projection apparatus 100-5. A corresponding application may be installed on the user device 510 as a remote control terminal of the projection apparatus 100-5. The user device 510 is, for example, a smart phone, a tablet computer, a remote computer, or other electronic apparatuses with computing and information processing functions. A network connection module in the projection apparatus 100-5 sends an online state to the network server 520 at a certain period after being normally connected to a network. The network server 520 notifies the remote control terminal (the user device 510) based on the online state. If the state of the projection apparatus 100-5 is intended to be changed, a command may be sent to the projection apparatus 100-5 through the user device 510 by the network server 520.

When the network server 520 does not receive the online state of the projection apparatus 100-5 within a predetermined period or a predetermined time, it means that the projection apparatus 100-5 is in an offline state, and the network server 520 transmits the offline state to the remote control terminal (the user device 510). If the user device 510 intends to change the state of the projection apparatus 100-5 at this time, the user device 510 sends an offline control command, and temporarily stores the offline control command to the network server 520. When the network server 520 receives the online state of the projection apparatus 100-5 again, the temporary stored offline control command is sent to a network connection module of the projection apparatus 100-5 or the network connection module of the projection apparatus 100-5 actively inquires the network server 520 whether there is the latest configuration command or setting data.

A relevant example is described here with the application scenario of FIG. 5. It is assumed that a school administrator uses the user device 510 to set a remote control command to the projection apparatus 100-5, and the content of the remote control command is to set the projection apparatus 100-5 to automatically turn on at 08:00 on the second day and project a specified image. At this time, the projection apparatus 100-5 is in the first sub-standby mode, and the network connection module of the projection apparatus 100-5 is not enabled and powered, so the remote control command is temporarily stored in the network server 520. When the time reaches about 7:50 in the morning of the second day, and a student comes to the classroom and is near the projection apparatus 100-5, the projection apparatus 100-5 switches from the first sub-standby mode to the second sub-standby mode due to a sensor (not shown) of the projection apparatus 100-5 sensing that there is a living object (the student) around (in the sensing area of) the projection apparatus 100-5. At this time, the network connection module of the projection apparatus 100-5 is enabled and powered, so the projection apparatus 100-5 obtains the remote control command from the network server 520 and further sets the predetermined turn-on time. At that time, when 08:00 sharp is reached, the projection apparatus 100-5 automatically turns on and projects the specified image.

Assuming that a parent intends to preset the projection apparatus 100-5 to automatically play an English educational video after the child returns home (for example, at 18:00), but the child temporarily leaves school early, the parent may set the projection apparatus 100-5 to turn on earlier at 17:30 with a remote control command through the user device 510. Once the child returns home, the sensor (not shown) of the projection apparatus 100-5 senses that there is a living object (the child) passing by around the projection apparatus 100-5 (the sensing area), and the projection apparatus 100-5 switches from the first sub-standby mode to the second sub-standby mode, and obtains the temporarily stored remote control command from the network server 520 to turn on earlier at the predetermined turn-on time (17:30) and play the English educational video.

Figure 6:
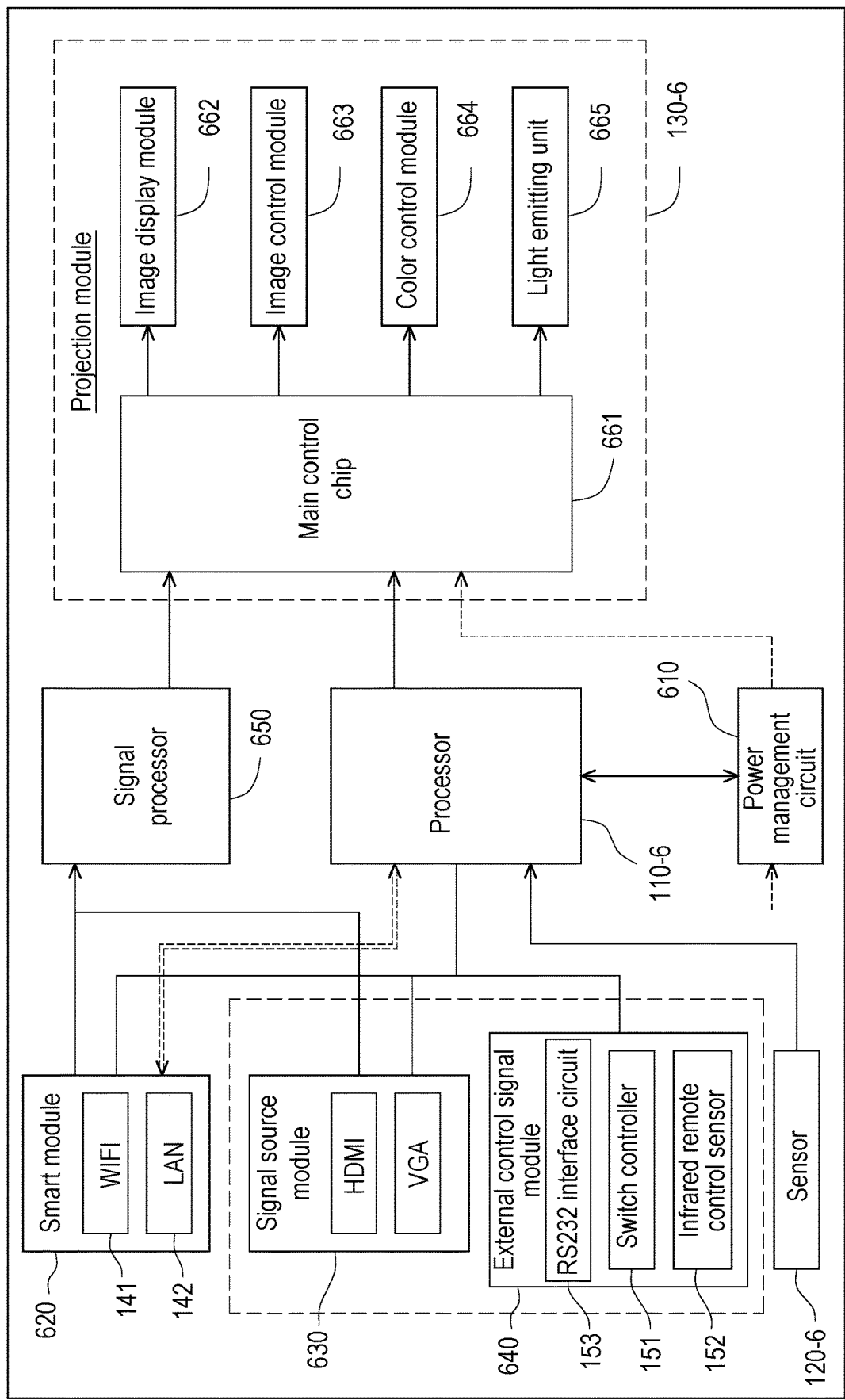
FIG. 6 is a functional block diagram of a projection apparatus according to a third embodiment of the disclosure.

FIG. 6 is a functional block diagram of a projection apparatus 100-6 according to a third embodiment of the disclosure. FIG. 1 and FIG. 6 are both projection apparatuses in accordance with the embodiments of the disclosure. Compared with the projection apparatus 100-1 in FIG. 1, the projection apparatus 100-6 in FIG. 6 has more detailed circuits and components. The projection apparatus 100-6 in FIG. 6 mainly includes a processor 110-6 (such as being implemented by a microprocessor), a sensor 120-6 (such as being implemented by a passive infrared sensor), and a projection module 130-6.

The projection apparatus 100-6 in FIG. 6 also includes a power management circuit 610, a smart module 620, a signal source module 630, an external control signal module 640, and a signal processor 650. The power management circuit 610 obtains power from the outside, and supplies power to each component of the projection apparatus 100-6 in FIG. 6. When the projection apparatus 100-6 in FIG. 6 is turned on, the power management circuit 610 supplies power to all the components in the projection apparatus 100-6. When the projection apparatus 100-6 in FIG. 6 is in the first standby mode, the power management circuit 610 mainly supplies power to the signal source module 630, the external control signal module 640, and the processor 110-6, and does not supply power to the remaining components. When the projection apparatus 100-6 in FIG. 6 is in the second standby mode, the power management circuit 610 mainly supplies power to the signal source module 630, the external control signal module 640, the processor 110-6, and the smart module 620, and does not supply power to the remaining components. When the projection apparatus 100-6 in FIG. 6 is in the third standby mode, the power management circuit 610 supplies power to the processor 110-6 and the sensor 120-6, selectively supplies power to the components according to the first sub-standby mode or the second sub-standby mode, and does not supply power to the projection module 130-6 at this time.

The smart module 620 is similar to the network connection device 140 in FIG. 1, and the smart module 620 may be connected to the network through the wireless network module 141 or the local area network module 142 and perform the remote control applications. The signal source module 630 may include corresponding circuits for connection and control of various image interfaces, such as high definition multimedia interface (HDMI) and video graphics array (VGA) interface. The external control signal module 640 is similar to the apparatus turn-on module 150 in FIG. 1 and may transmit control signals to the processor 110-6 through various manners. The external control signal module 640 of the embodiment may include the switch controller 151, the infrared remote control sensor 152, and the RS232 interface circuit 153.

In detail, the signal processor 650 may obtain an image signal from an image source (for example, the smart module 620 or the signal source module 630), and provide the image signal to the projection module 130-6 after processing. The projection module 130-6 mainly includes a main control chip 661, an image display module 662, an image control module 663, a color control module 664, and a light emitting unit 665. The main control chip 661 processes the image signal using the modules 662 to 664, and controls the light emitting unit 665 to provide an illumination beam for projecting an image. The light emitting unit 665 may be an array composed of light emitting diodes or/and laser diodes. In particular, the modules described in the embodiments of the disclosure all include physical circuits, firmware, and devices. For example, the smart module 620 in FIG. 6 may be a smart circuit, and so on.

In summary, the projection apparatus and the control method thereof provided by the disclosure use the sensor in the projection apparatus to sense whether there is the living object around the projection apparatus, so that the projection apparatus may switch from the state non-connectable to the network to the state connectable to the network in the case where there is the living object around the projection apparatus, thereby obtaining the latest setting data through the network, so as to implement remote control. Also, in the case where the living object is not around the projection apparatus, the projection apparatus maintains or switches to the state non-connectable to the network, so as to save power consumption.

The foregoing description of the preferred embodiments of the invention is presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the disclosure" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number is given. The abstract of the disclosure is provided to comply with the rules requiring an abstract, which will allow a searcher to quickly ascertain the subject matter of the technical disclosure of any patent issued from this disclosure. It is submitted with the understanding that it will not be configured to interpret or limit the scope or meaning of the claims. Any advantages and benefits described may not apply to all embodiments of the invention. It should be appreciated that variations may be made in the embodiments described by persons skilled in the art without departing from the scope of the disclosure as defined by the following claims. Moreover, no element and component in the disclosure is intended to be dedicated to the public regardless of whether the element or component is explicitly recited in the following claims.

What is claimed is:

1. A projection apparatus, comprising:
a processor, a sensor, and a projection module, wherein the processor is respectively coupled to the sensor and the projection module,
the processor is configured to:
set the projection apparatus to a first sub-standby mode when receiving a command corresponding to a standby mode;
enable the sensor to sense whether there is a living object located in a sensing area outside the projection apparatus;
maintain the standby mode as the first sub-standby mode in response to sensing that the living object is not in the sensing area; and
set the standby mode to switch from the first sub-standby mode to a second sub-standby mode in response to sensing that there is the living object in the sensing area, wherein
a maximum power consumption of the projection apparatus in the first sub-standby mode is less than a maximum power consumption of the projection apparatus in the second sub-standby mode, and in the first sub-standby mode and the second sub-standby mode, the projection module is not enabled.

2. The projection apparatus according to claim 1, wherein the standby mode comprises a first standby mode, a second standby mode, and a third standby mode, wherein
in the first standby mode and the second standby mode, the processor does not enable the sensor, a maximum power consumption of the first standby mode is the same as the maximum power consumption of the first sub-standby mode, and a maximum power consumption of the second standby mode is the same as the maximum power consumption of the second sub-standby mode, when the processor sets the standby mode of the projection apparatus to the third standby mode, the projection apparatus switches between the first sub-standby mode and the second sub-standby mode, and in the third standby mode, the sensor of the projection apparatus is enabled.

3. The projection apparatus according to claim 1, further comprising:
a network connection device, coupled to the processor, wherein
in the first sub-standby mode, the network connection device is not enabled,
in the second sub-standby mode, the network connection device is enabled, and setting data is obtained by the network connection device.

4. The projection apparatus according to claim 3, wherein in the second sub-standby mode, the processor is configured to:
judge whether the setting data comprises a predetermined turn-on time of the projection apparatus;
set the predetermined turn-on time of the projection apparatus according to the setting data in response to the setting data comprising the predetermined turn-on time; and
sensing, by the sensor, whether there is the living object located in the sensing area in response to the setting data not comprising the predetermined turn-on time or the predetermined turn-on time not yet being reached.

5. The projection apparatus according to claim 4, wherein in the first sub-standby mode or the second sub-standby mode, the processor judges whether the predetermined turn-on time is reached to control the projection apparatus to turn on.

6. The projection apparatus according to claim 4, wherein when the projection apparatus is set to turn on at the predetermined turn-on time according to the setting data, the processor is configured to:
obtain image data by the network connection device; and
enable the projection module to project according to the image data.

7. The projection apparatus according to claim 1, wherein the sensor comprises a passive infrared detector, a heat source sensor, a laser sensor, or a combination thereof.

8. The projection apparatus according to claim 1, further comprising:
an apparatus turn-on module, configured to turn on the projection apparatus, wherein
the apparatus turn-on module is powered and enabled in the first sub-standby mode and the second sub-standby mode.

9. The projection apparatus according to claim 1, wherein the processor is configured to:
enable the sensor to continuously sense in real time whether there is the living object located in the sensing area in the first sub-standby mode.

10. The projection apparatus according to claim 1, wherein the processor is configured to:
set the standby mode to switch from the second sub-standby mode to the first sub-standby mode in response to sensing that the living object is not located in the sensing area within a preset time in the second sub-standby mode.

11. The projection apparatus according to claim 1, further comprising:
a network connection device, coupled to the processor, wherein the processor configured to:
enable and disable the network connection device at a preset frequency, and obtain setting data when the network connection device is turned on in the first sub-standby mode.

12. A control method of a projection apparatus, wherein the projection apparatus comprises a processor, a sensor, and a projection module, the processor is respectively coupled to the sensor and the projection module, the control method comprising:
setting the projection apparatus to a first sub-standby mode when receiving a command corresponding to a standby mode;
enabling the sensor to sense whether there is a living object located in a sensing area outside the projection apparatus;
maintaining the standby mode as the first sub-standby mode by the processor in response to sensing that the living object is not in the sensing area; and
setting the standby mode to switch from the first sub-standby mode to a second sub-standby mode by the processor in response to sensing that there is the living object in the sensing area, wherein
a maximum power consumption of the projection apparatus in the first sub-standby mode is less than a maximum power consumption of the projection apparatus in the second sub-standby mode, and in the first sub-standby mode and the second sub-standby mode, the projection module is not enabled.

13. The control method according to claim 12, wherein the standby mode of the projection apparatus comprises a first standby mode, a second standby mode, and a third standby mode, wherein
in the first standby mode and the second standby mode, the processor does not enable the sensor, a maximum power consumption of the first standby mode is the same as the maximum power consumption of the first sub-standby mode, and a maximum power consumption of the second standby mode is the same as the maximum power consumption of the second sub-standby mode,
wherein the step of enabling the sensor in the standby mode of the projection apparatus comprises:
switching the projection apparatus between the first sub-standby mode and the second sub-standby mode when the standby mode of the projection apparatus is set to the third standby mode, wherein in the third standby mode, the sensor of the projection apparatus is enabled.

14. The control method according to claim 12, wherein the projection apparatus further comprises:
a network connection device, coupled to the processor, wherein
in the first sub-standby mode, the network connection device is not enabled,
in the second sub-standby mode, the network connection device is enabled, and setting data is obtained by the network connection device.

15. The control method according to claim 14, further comprising:
judging whether the setting data comprises a predetermined turn-on time of the projection apparatus, and setting the predetermined turn-on time of the projection apparatus according to the setting data by the processor in the second sub-standby mode; and
sensing whether there is the living object located in the sensing area through the sensor in response to the setting data not comprising the predetermined turn-on time or the predetermined turn-on time not yet being reached.

16. The control method according to claim 15, further comprising:
judging whether the predetermined turn-on time is reached to control the projection apparatus to turn on through the processor in the first sub-standby mode or the second sub-standby mode.

17. The control method according to claim 15, wherein the step of setting the projection apparatus to turn on at the predetermined turn-on time according to the setting data further comprises:
obtaining image data by the network connection device; and
enabling the projection module to project according to the image data.

18. The control method according to claim 12, wherein the step of enabling the sensor to sense whether there is the living object located in the sensing area comprises:
enabling the sensor to continuously sense in real time whether there is the living object located in the sensing area in the first sub-standby mode.

19. The control method according to claim 12, further comprising:
setting the standby mode to switch from the second sub-standby mode to the first sub-standby mode in response to sensing that the living object is not located in the sensing area within a preset time in the second sub-standby mode.

20. The control method according to claim 12, wherein the projection apparatus comprises a network connection device, and the network connection device is coupled to the processor, the control method further comprising:
enabling and disabling the network connection device at a preset frequency, and obtaining setting data when the network connection device is turned on in the first sub-standby mode.

* * * * *